United States Patent [19]

Notteau

[11] 3,835,334

[45] Sept. 10, 1974

[54] REMOTE POWER SUPPLY FOR REPEATERS

[75] Inventor: Jean-Luc Notteau, Paris, France

[73] Assignee: Telecommunications Radioelectrigues Et Telephoniques T.R.T., Paris, France

[22] Filed: Apr. 13, 1972

[21] Appl. No.: 243,594

[30] Foreign Application Priority Data

Apr. 15, 1971 France .............................. 71.13280

[52] U.S. Cl. ................................ 307/69, 179/170 J

[51] Int. Cl. ............................................ H02j 1/10

[58] Field of Search... 307/43, 69; 178/70 R, 70 TS; 179/170 R, 170 T, 170 J

[56] References Cited

UNITED STATES PATENTS

| | | | |
|---|---|---|---|
| 3,459,895 | 8/1969 | Ebhardt | 179/170 J |
| 3,535,472 | 10/1970 | Babbitt et al. | 179/170 J |
| 3,535,474 | 10/1970 | Duimelaar | 179/170 J |

*Primary Examiner*—Robert K. Schaeffer
*Assistant Examiner*—William J. Smith
*Attorney, Agent, or Firm*—Frank R. Trifari

[57] ABSTRACT

A remote power supply system for transmission line repeaters where the local power supply unit of the respective repeaters are all connected in parallel with the remote power supply line. Each of these local power supply units comprises a d-c to d-c converter that automatically controls the voltage applied so that a constant lower supply voltage that is equal for all the repeaters is supplied to each repeater.

4 Claims, 7 Drawing Figures

REMOTE POWER SUPPLY FOR REPEATERS

Figure 1:
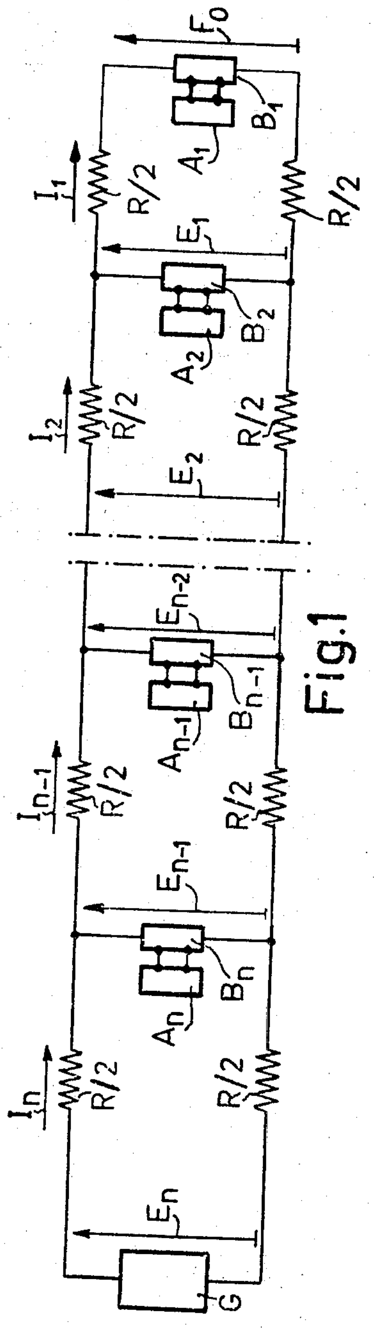

The invention relates to a remote power supply system for repeaters distributed over different points in a transmission line, which system is provided on one side of this line with a direct voltage generator providing the power supply over a remote supply line for all repeaters and comprising a power supply unit at each repeater, which unit derives power from the remote supply line for supplying the relevant repeater.

The phantom circuit obtained in a telephone connection employing four transmission lines is used as a remote power supply line. All repeaters in the transmission line are identical and must thus each be supplied by an arrangement which provides a direct voltage of, for example, 12 volts at a substantially constant current level of, for example, 80 mA. Generally the repeaters are separated over a fixed distance which is referred to as a line section.

In the known remote power supply systems of this type the individual supply unit for each repeater consists of a Zener diode which is arranged in series with the remote power supply line and which provides a voltage adjusted for the power supply of the repeater. In such a system a current flows through the loop constituted by the remote power supply line and the value of this current is equal to the sum of the current applied to the repeater and the current in the Zener diode. If, in accordance with the above-mentioned example the repeater requires a current of 80 mA and a current of 20 mA flows through the Zener diode, the generator arranged at one end of the line must supply a constant current of 100 mA. This generator must supply this current at a voltage which is equal to the sum of the voltages applied to the repeaters (12 volt for each repeater) with the addition of the sum of the line voltage losses.

Such a system has the drawback of a poor efficiency due to the line voltage losses which are often higher than the useful voltage applied to the repeaters; furthermore this system has a limited range in the sense that it can only supply a limited number of repeaters because the maximum voltage which can be applied to the line in accordance with the prevailing prescriptions is limited to approximately 160 volts; finally the system necessitates the manufacture of a constant current generator which is to be specially designed for remote power supply.

The invention provides a remote power supply system for repeaters of a different conception which has for its object to obtain an efficiency which is better than that of the known systems and which makes it possible, in case of an equal voltage at the input of the remote power supply line, to supply a larger number of repeaters or, in case of an equal number of repeaters, permits of a reduction of this voltage and which finally employs a constant voltage generator at the input of the line, which generator is of a type already used in telephone exchanges.

According to the invention such a system is characterized in that the power supply units for the repeaters are connected in parallel onto the remote power supply line and that each of these power supply units comprises a dc-dc converter of the type provided with a time controlled electronic switch (chopper) incorporated in a control loop, said converters automatically controlling the input voltage applied in parallel thereto at a lower constant supply voltage value which is equal for all repeaters.

Figure 5:
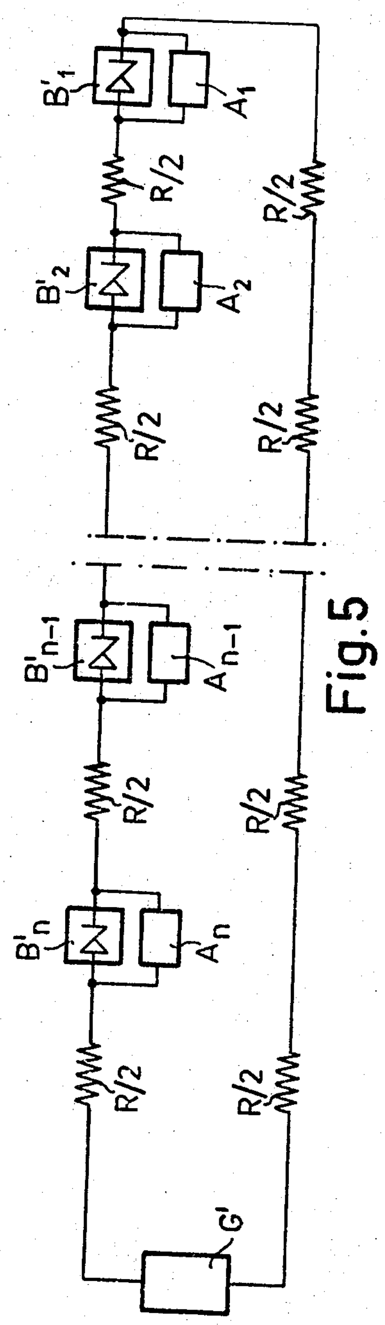
Figure 2:
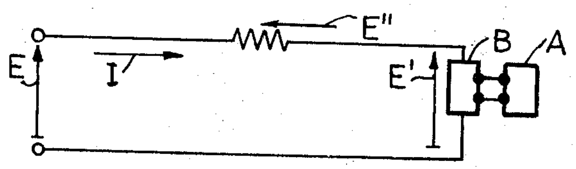
Figure 3:
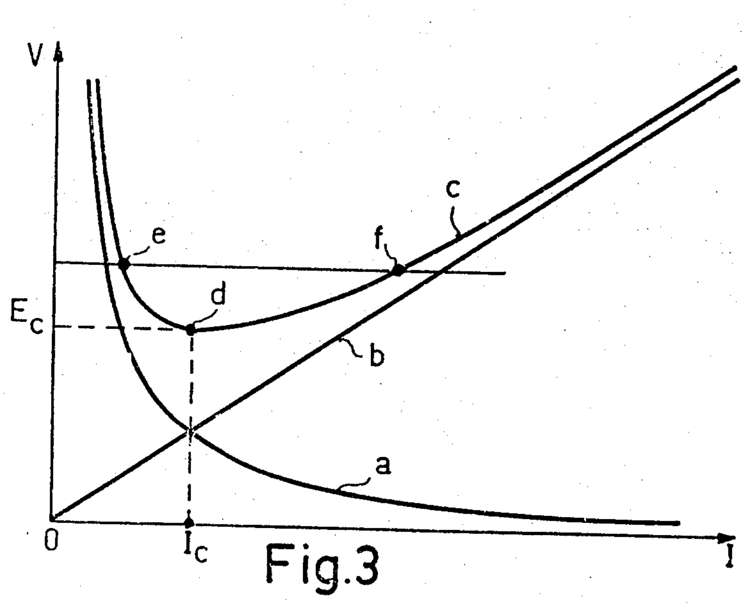
Figure 6:
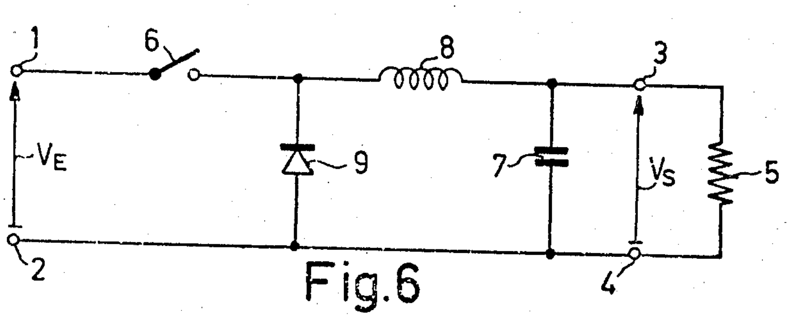
Figure 4:
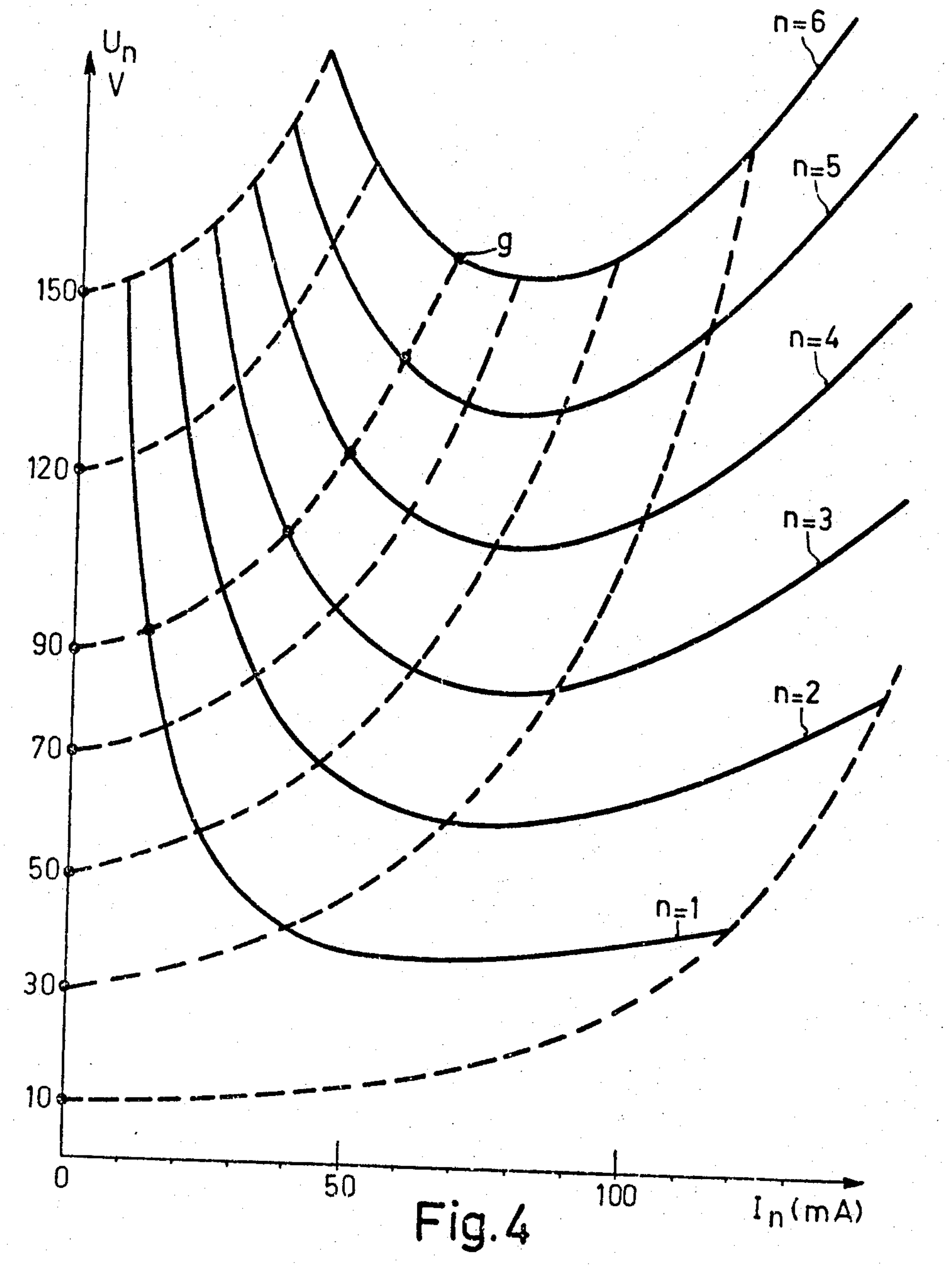
Figure 7:
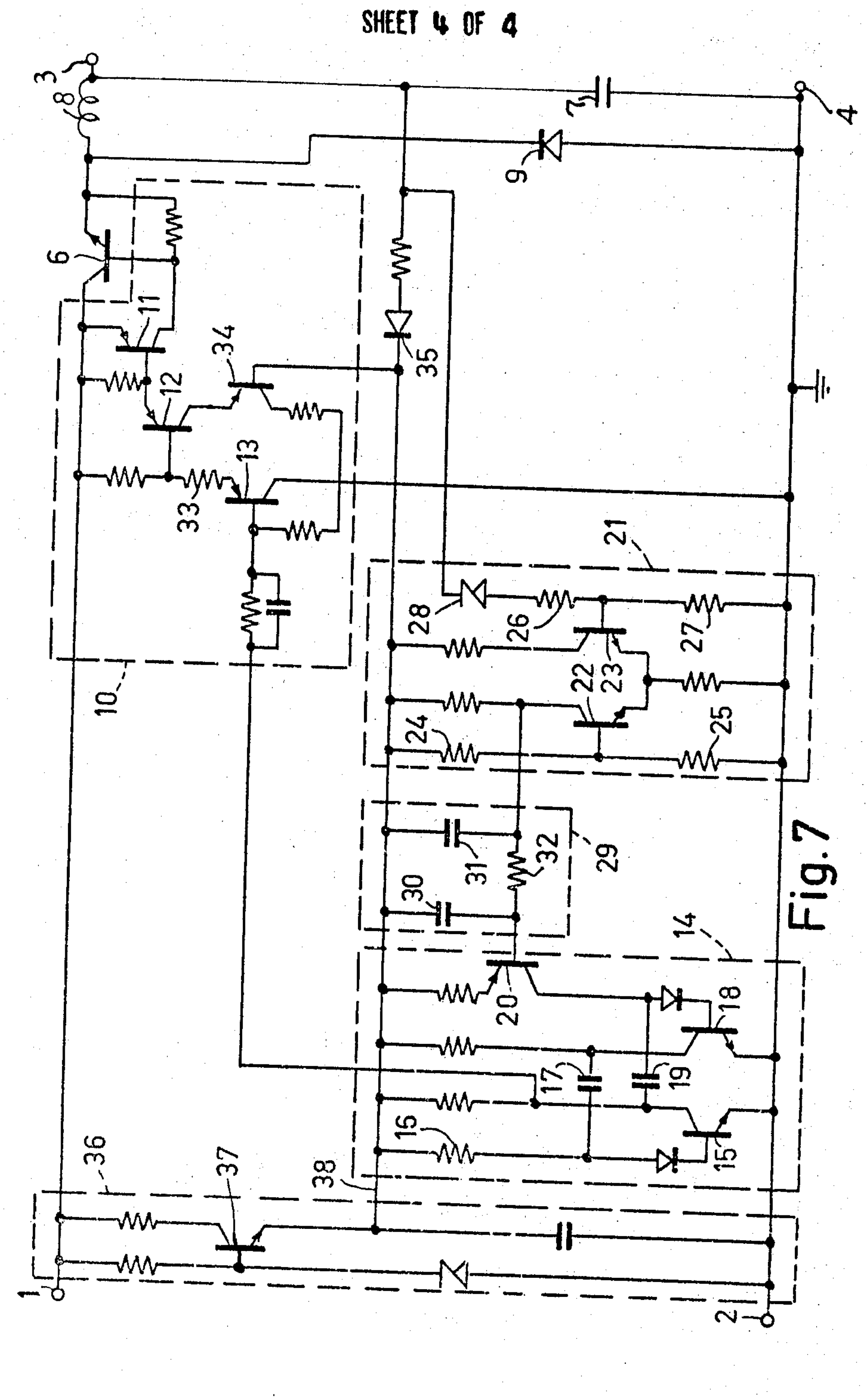

In order that the invention may be readily carried into effect, a embodiment thereof will now be described in detail by way of example and with reference to the accompanying diagrammatic drawings in which FIG. 1 shows a block diagram of the structure of a remote power supply system according to the invention FIG. 2 shows the circuit diagram of such a system using one repeater FIG. 3 shows a number of curves to explain the operation of the system according to the invention FIG. 4 shows the distinctive input characteristics of a system according to the invention using six repeaters FIG. 5 shows a block diagram of the structure of a known remote power supply system FIG. 6 is a circuit diagram showing the principle of the dc-dc converter FIG. 7 shows the detailed circuit diagram of an embodiment of the dc-dc converter as is preferably used in the system according to the invention.

FIG. 1 shows the general structure of a remote power supply system according to the invention.

The supply energy for all repeaters A*n*, A*n*—1, ... $A_2$ is provided by a generator G which is connected to the input of a remote power supply line. In the embodiment shown in which the repeaters are spaced at mutually equal distances each line section of the remote power supply line includes a resistor having the same value $R/2$. For a line constituted by a cable having a cross-section of 0.4 mm and line sections bridging a distance of 2 kms each the value of R per section is equal to 280 ohms.

According to the invention a particularly advantageous power supply system is obtained if the supply units B*n*, B*n*—1,... $B_2$, $B_1$ for the repeaters A*n*, A*n*—1,... $A_2$, $A_1$ are connected in parallel onto the remote power supply line and if each of these supply units includes a dc-dc converter which is of a type provided with a time-controlled electronic switch (chopper) incorporated in a control loop, which converters automatically control the input voltage applied in parallel thereto at the required constant and lower voltage supply value which is equal for all repeaters. The voltages occurring at the inputs of the respective supply units may be mutually different because on the one hand they are dependent on the position of the repeaters along the line and on the other hand they are dependent on the diameter of the cable. A supply unit of the kind used in the system according to the invention may, however, be realized in such a manner that it is suitable for input voltages of from 30 to 160 volts so that the important advantage is obtained that these supply units are suited for the majority of the conventional lines.

To explain the operation of the remote power supply system employing n repeaters in FIG. 1, the operation of a system employing only one amplifier as shown in FIG. 2 is considered for the sake of simplicity.

In this case the power supply unit B of the repeater A is connected to the end of a line including a resistor R to whose input the direct voltage E is applied.

The power to be supplied to the repeater is substantially constant as well as the efficiency of the power supply unit B, which means that the power P derived by the power supply unit B from the line is likewise substantially constant.

If I is referred to as the current in the line, E′ is the voltage across the power supply unit B and E″ is the voltage across resistor R, the following equations are obtained for this system:

$E' = P/I$ $E'' = R\,I$ $E = R\,I + (P/I)$

It is important to note that P is a constant in these equations. In FIG. 3 the useful part is represented by the curve $E' = f(I)$ which is a symmetrical hyperbola with asymptotes $V = 0$ and $I = 0$. The straight line 6 represents the function $E'' = f(I)$.

Curve $c$ represents the input characteristics of the system $E = f(I)$. This can easily be derived from the curves $a$ and $b$. It is a hyperbola with the vertical axis $I = 0$ as the asymptote and with the straight line $E'' = RI$ as the oblique asymptote.

It is to be noted that the input characteristic $E = f(I)$ exhibits a minimum at point $d$ for which $E$ assumes the critical value $Ec$. The system can only operate when the voltage E which is applied to the input of the line is higher than this critical voltage $Ec$. It will be readily evident that at this voltage $Ec$ at the input of the line the voltage drop E″ across resistor R is equal to the voltage E′ at the input of the power supply unit B. In other words, the power supplied to the input of the line is in this case evenly distributed between the power which is dissipated in resistor R and the power P which is taken up by power supply unit B.

When the critical current which corresponds to $Ec$ is referred to as $Ic$, the following equations are obtained:

$Ec\ Ic = 2\ P$ $P = RIc^2$ from which follows that: $Ec = 2\ \sqrt{PR}$.

The latter equation makes it possible to calculate the minimum voltage $Ec$ to be applied to the input of the system for a given power P which is taken up by the power supply unit B at a given resistance R which characterizes the line.

It is even possible to calculate the critical current:

$I_c = \sqrt{P/R}$

It is easy to take into account the condition $E \geqslant Ec$ during operation. When the system is put into operation this condition is likewise to be taken into account; to this end it is necessary that at an arbitrary instant of rendering the system operative the voltage E which may be adjusted at a given time constant is always higher than the critical voltage $Ec$ which is dependent on the instantaneous power taken up by power supply unit B. In order to observe this condition the power supply unit B is to be designed in practice in such a manner that it has a long time constant relative to the time constant at which the voltage E builds up. FIG. 3 shows that there are two different operating points in the system at an input voltage E which is higher than $Ec$. These two operating points denoted by $e$ and $f$ are the points of intersection of the curve $c$ with the horizontal straight line which corresponds to the chosen value E. Point $e$ corresponds to a stable operation having a satisfactory efficiency. Point $f$ corresponds to a non-stable operation having a poor efficiency because the voltage drop in the line is larger than the voltage applied to power supply unit B. The useful part of the curve $c$ thus lies to the left of the critical point $d$. In this useful part $I < Ic$. Power supply unit B must thus be designed in such a manner that the operating point is in this useful part after the system has been put into operation. This is obtained if at an arbitrary instant of pútting the system into operation the power taken up by power supply unit B is lower than the nominal power P. To this end the time constant of the power supply unit B must be chosen to be long relative to the time constant with which the voltage E at the input of the system builds up.

In practice it is thus found that in order to always satisfy the condition $E > Ec$ and $I < Ic$ the power supply unit B is to be designed in such a manner that the output voltage which is provided thereby for the repeater builds up at a much slower rate than the input voltage E.

In order to calculate the currents and voltages in a system using different repeaters as in FIG. 1 in such a manner that the performance of the system can be determined, the following practical methods illustrated in FIG. 4 are used.

The constant power P which is taken up by each supply unit $B_1$, $B_2$, ..... $Bn-1$, $Bn$ is considered. For the power P 1.2 Watts have been taken while the useful power to be supplied to the repeater is 1 Watt at which the efficiency of the power supply unit is assumed to be 83.5 percent. Likewise the resistor R of the line section between two repeaters has been chosen; for a line consisting of a cable of 0.4 mm and repeaters spaced 2 kms apart the value of R is 280 Ohms. Subsequently, different values for Eo have been taken successively for the voltage across the power supply unit $B_1$ which is farthest remote from generator G. Subsequently, the voltages $E_1$, $E_2$, ....$En-1$, En and the currents $I_1$, $I_2$, ....$In-1$, In are calculated one by one for each value of $Eo$ which voltages and currents denote the input voltages and input currents of the system employing 1,2 ... $n-1$, $n$ repeaters.

In the embodiment of FIG. 4 these calculations are performed for a system having not more than six repeaters. The results are shown in this Figure in the following manner. The input voltages and input currents are plotted on the $x$- and $y$-axes, respectively. The points corresponding to the voltages $E_o$ used in the calculation are presented on the $y$-axis particularly the points $Eo$ = 10 V, 30 V, 50 V, 70 V, 90 V, 120 V, 150 V. Broken-line curves start from these points which connect the coordinate pairs ($En$, $In$) which are calculated for different values of $Eo$ in a system using n repeaters in which $n$ assumes the integral value of 1 to 6. The solid-line curves are each obtained by connecting the co-ordinate pairs ($En$, $In$) corresponding to an equal number of $n$ repeaters at different values of $Eo$. These solid-line curves are thus characterized by the values $n = 1, 2... 6$. They each represent the input characteristic of a system using one, two or up to six repeaters.

They have the same properties as curve $c$ of FIG. 3 which represents the input characteristic of a system using one amplifier. Each curve shows a minimum corresponding to a critical voltage Ec and a critical current Ic. The useful part of each curve is located to the left of the minimum so that in this useful part the input voltage is higher than Ec and the input current is lower than Ic.

Starting from the network of curves shown in FIG. 4 the maximum range of the system and its efficiency may be determined for a given voltage of, for example, 160 volt applied to the input of the remote power supply line. Likewise the voltages and currents at the points of the line where the repeaters are located can be determined which results are of course obtained at values of P and R which make the set-up of the network of curves possible. For different values of P and R different networks of curves are found.

In the case of FIG. 4 it can be seen that for the curve having a parameter of $n = 6$, the point $g$ provides the voltage E6 to be applied to the input of a remote power supply line of a system using six repeaters. This voltage E6 of 160 volts is provided by generator G which provides the current $I_6$ of 67 mA. The power supplied by this generator is then approximately 10.7 Watts. According to the initial hypotheses each power supply unit takes up a power of 1.2 Watts and supplies a useful power of 1 Watt to each repeater. The total useful power is 6 Watts and the overall efficiency of the system is 56 percent.

The voltage E5 to E1 across the power supply units B6 to B2 are provided by the ordinates of the points of intersection of the broken-line curve which passes through the point $g$ with the solid-line curves having parameters of $n=5$ to $n=1$. The voltage E$o$ across power supply unit B1 is provided by the points of intersection of the broken-line curve with the $y$-axis. It can be seen that the voltages across the six power supply units are located between 90 Volts and 142 Volts.

In order to compare the performance of the system according to the invention with that of the known system, FIG. 5 shows the general structure of such a known system. FIG. 5 shows the power supply units B'$n$, B'$n-1$ ... $B'_2$, $B'_1$ which are incorporated in series in the remote power supply line and which consist of a Zener diode directly providing the direct voltage of, for example, 12 Volts for the repeaters A$n$, A$n$−1 ... $A_2$, $A_1$. In the embodiment of the system according to the invention it is assumed that the useful power to be supplied to each repeater is 1 Watt and that a power of 1.2 Watts is taken up by a Zener diode and a repeater so that the power supply unit likewise has an efficiency of 83.5 percent. In that case the constant current which is to be supplied by the generator G' connected to the input of the line is 100 mA. It is likewise assumed that, as in the embodiment of the system according to the invention, the resistance R of a section between two repeaters is 280 Ohms. In this embodiment the total voltage drop across a line using $n$ repeaters is:

$$12n + 0.1 \times 280\ (n + 1) = 40\ n + 28 \text{ Volts.}$$

If the voltage provided by G' is 160 Volts, there must apply that $40\ n + 28 < 160$ V which yields a number of three repeaters which can receive remote power supply.

The useful power supplied to the three repeaters is 3 Watts and the total power provided by generator G' is 16 Watts. The overall efficiency of the system is approximately 19 percent.

The following table clearly shows the advantages of the system according to the invention to the known system with different examples of cable diameter and section length at P = 1.2 Watts and a voltage of 160 V at the input of the line.

| Systems | Dia. of the cable | Section length in km | Number of repeaters | Range in km | Efficiency in % |
|---|---|---|---|---|---|
| known | 0.7 | 2 | 3 | 8 | 19 |
| according to inv. | 0.4 | 2 | 6 | 14 | 56 |
| known | 0.6 | 3 | 4 | 15 | 25 |
| according to inv. | 0.6 | 3 | 7 | 24 | 62.5 |
| known | 0.8 | 4 | 5 | 24 | 31 |
| according to inv. | 0.8 | 4 | 8 | 36 | 64 |
| known | 1 | 5 | 6 | 35 | 37.5 |
| according to inv. | 1 | 5 | 10 | 55 | 54 |

The invention also provides a favourable embodiment of a power supply unit of the type as used in the system according to the invention. This unit must provide the energy for the repeater at a higher efficiency which is substantially independent over a large range of the voltage applied to the input. In other words, the unit must supply a voltage at a high efficiency to the constant load which is constituted by the repeater. In spite of the considerable variations in the voltages applied to the input, this voltage is stabilized.

To this end the power supply unit is constituted as a dc-dc converter arranged as a "voltage reducer" of the kind described, for example, by Prime and Elias in "AWA Technical Review" 1966, Vol. 13, no. 3, pages 141–168.

The basic circuit diagram of this converter is shown in FIG. 6. The input voltage V$e$ is applied to the terminals 1 and 2. The output voltage V$s$ is obtained across the load constituted by the resistor 5, which load is connected to the output terminals 3 and 4.

The converter includes a switch 6 which consists of a transistor charging the capacitor during the cut-off period $T_1$ through the inductor 8. During the period $T_2$, when the switch is open, a current flows through the inductor via the diode 9. If the full switching cycle of the switch is taken to be $T = T_1 + T_2$ the following relation is obtained between the input voltage $V_1$ and the output voltage V$s$:

$$V_s = Ve\ (T_1/T)$$

In the power supply unit for the repeater according to the invention the output voltage V$s$ is stabilized on the value required by the repeater in spite of the very large variations of the input voltage V$e$ and the small variations of the load constituted by the repeater, and this with the aid of a control loop which controls the conducting period $T_2$ of the switch which makes it possible to modify T.

Special steps have been taken to obtain a satisfactory efficiency and a slow build-up of the output voltage V$s$ after the system has been put into operation so that the stability of the remote power supply system is ensured.

FIG. 7 shows an embodiment of such a system.

FIG. 7 only includes the elements important for the explanation of the operation. The input terminals 1 and 2, the output terminals 3 and 4, the switching transistor 6, the capacitor 7, the inductor 8 and the diode 9 are found in this system with the same reference numerals as in FIG. 6.

The switching transistor 6 is driven by the repeater 10 which includes transistors 11, 12 and 13 which amplify the control signal provided by multivibrator 14.

In multivibrator 14 the cut-off period of transistor 15 is determined by the fixed time constant of resistor 16 and capacitor 17. It will be readily evident that during the cut-off period of transistor 15 the switching transistor 6 is conducting and that its conducting period $T_1$ is constant. The cut-off period of the other transistor 18 of the multivibrator controls the period $T_2$ when transistor 6 is cut off. This period is determined by the variable time constant which is obtained by capacitor 19 and transistor 20 arranged as a current injector and being driven by the error signal.

This error signal is provided by the differential amplifier 21 which includes two transistors 22 and 23. A reference voltage is applied to the base of transistor 22, which voltage is obtained with the aid of potential divider 24 and 25 connected between ground and the voltage which is substantially equal to the output voltage $V_s$ being constant during permanent operation. The base of transistor 23 is connected to the junction of resistors 26 and 27 which is fed by a voltage which due to the Zener diode 28 is highly dependent on the variations of the output voltage $V_s$. This output voltage $V_s$ can be accurately adjusted by controlling, for example, resistor 26. An integration circuit 29 which is constituted by capacitors 30 and 31 and resistor 32 is provided between the differential amplifier 10 and the control for the multivibrator 14. This circuit makes it initially possible to delay the operation of the control and thereby build up the output voltage very gradually which ensures correct and stable operation of the remote power supply system. This makes it likewise possible to readily obtain the required stability of the control.

On the other hand it is important, for the purpose of efficiency, a high effieiency, to withdraw as little as possible power from the input voltage.

To this end amplifier 10 which is fed by this input voltage is adapted in such a manner that an eminent efficiency can be obtained. The value of collector resistor 33 of transistor 13 is chosen to be high (200 kohm); the emitter-collector path of the transistor 34 is connected to the collector of transistors 12, which transistor is arranged as a current injector calibrated at 1 mA; these steps make it likewise possible to obtain quick switching over of transistor 6 which reduces the losses in this transistor.

To improve the efficiency, the differential amplifier 21 and the multivibrator 14 are fed from the output voltage $V_s$ which is applied to these current circuits through the diode 35. However, in that case it is necessary to use an auxiliary supply 36 for putting the system into operation which supply is connected to the terminals 1 and 2 for the input voltage $V_e$ and which replaces the absent output voltage during the stage when the system is put into operation. This very simple auxiliary supply which particularly includes transistor 37 renders it initially possible to apply a voltage to line 8; diode 35 prevents this auxiliary voltage from being applied to ground. When the output voltage $V_s$ is built up, diode 35 becomes conducting, transistor 37 is cut off and the auxiliary supply 36 no longer withdraws energy from the input voltage $V_e$.

The arrangement according to FIG. 7 has made it possible to obtain an output voltage $V_s$ of 12 Volts stabilized on 1 percent at input voltages $V_e$ which vary between 30 and 160 Volts. The useful power of 1 Watt which is supplied to the load is obtained at an efficiency which is always between 81 and 85 percent.

What is claimed is:

1. A remote power supply system for plurality of repeaters distributed over different points of a transmission line, comprising a direct voltage generator at one end of said line, power supply units for said repeaters connected at said points in parallel with said transmission line, each of said power supply units including a d-c to d-c converter having a capacitor for providing voltages to an assigned repeater by charging said capacitor from the voltage of said direct voltage generator for a fixed period of time and then discharging said capacitor for a variable period of time, said variable period of time being determined by the variation of the output voltage of said d-c converter from a reference voltage to provide an efficient constant voltage to said repeater that is equal to the voltages supplied to other repeaters even though the voltage from said voltage generator at the different points of said transmission lines varies.

2. A remote power supply system for plurality of repeaters distributed over different points of a transmission line, comprising a direct voltage generator at one end of said line, power supply units for said repeaters connected at said points in parallel with said transmission line, each of said power supply units including a d-c to d-c converter for providing voltages to an assigned repeater by charging a capacitor from the voltage of said direct voltage generator for a fixed period of time and then discharging said capacitor for a variable period of time, said variable period of time being determined by the variation of the output voltage of said d-c converter from a reference voltage to provide an efficient constant voltage to said repeater that is equal to the voltages supplied to other repeaters even though the voltage from said voltage generator at the different points of said transmission lines varies, said d-c to d-c converter including a voltage input terminal for receiving a varying d-c voltage from said direct voltage generator, a storage capacitor for charging by the voltage at said voltage input terminal, means for periodically charging and discharging said storage capacitor, said charging and discharging means including semiconductor switching device coupled to said voltage input terminal for interrupting the charging of said storage capacitor, control means coupled to said semiconductor switching means for closing said semiconductor switch for a fixed period of time and opening same for a variable period of time in response to variations in the voltage across said storage capacitor relative to a fixed voltage reference, an inductor coupled to said semiconductor switching means for slowing down the rate of charging of said storage capacitor, diode means coupled across said inductor and said storage capacitor to provide means for discharging said storage capacitor when said semiconductor switching means are opened, and a voltage terminal connected in parallel with said storage capacitor for providing a constant voltage output from said d-c to d-c converter.

3. A remote power supply system as claimed in claim 2, wherein said control means coupled to said semiconductor switching means comprises a differential amplifier coupled to said constant voltage to said repeater for providing an output signal representing the difference between said constant voltage to said repeater and a reference voltage, an integrating circuit coupled to said differential amplifier having a time constant such that the time required for building up the output voltage is long relative to the time required for the building up of the input voltage to said storage capacitor, a bistable multivibrator having one switching time fixed and the other having a switching time determined by said integrating circuit, an amplifying means coupled to said multivibrator and adapted to control said semiconductor switching means.

4. A remote power supply system as claimed in claim 2, wherein each of the supply units for the repeaters further comprises an auxiliary supply coupled to the supply line when every system is initially put into operation, said auxiliary supply being connected between the input terminals of the power supply unit and the supply line of said control means for said semiconductor switching means, said control means being automatically connected to the output terminals of the power supply unit when the output voltage of said supply unit reaches a nominal value.

* * * * *